(12) United States Patent
Abe et al.

(10) Patent No.: US 9,643,678 B2
(45) Date of Patent: May 9, 2017

(54) BICYCLE SETTING CALCULATING SYSTEM, METHOD OF CALCULATING BICYCLE SETTING, AND COMPUTER-READABLE STORAGE MEDIUM

(71) Applicant: SHIMANO INC., Sakai (JP)

(72) Inventors: Ryuji Abe, Sakai (JP); Mitsuru Tauchi, Sakai (JP); Takeshi Oi, Sakai (JP)

(73) Assignee: SHIMANO INC., Sakai (JP)

( * ) Notice: Subject to any disclaimer, the term of this patent is extended or adjusted under 35 U.S.C. 154(b) by 293 days.

(21) Appl. No.: 14/334,600

(22) Filed: Jul. 17, 2014

(65) Prior Publication Data

US 2016/0016624 A1 Jan. 21, 2016

(51) Int. Cl.
*F16H 61/02* (2006.01)
*B62J 99/00* (2009.01)
*B62M 25/00* (2006.01)

(52) U.S. Cl.
CPC .......... *B62J 99/00* (2013.01); *F16H 61/0213* (2013.01); *B62J 2099/0013* (2013.01); *B62J 2099/0026* (2013.01); *B62M 2025/003* (2013.01); *F16H 2061/022* (2013.01)

(58) Field of Classification Search
None
See application file for complete search history.

(56) References Cited

U.S. PATENT DOCUMENTS

| | | | |
|---|---|---|---|
| 2004/0220712 A1* | 11/2004 | Takeda | B62J 99/00 701/32.5 |
| 2005/0029772 A1* | 2/2005 | Oi | B62J 6/18 280/281.1 |
| 2013/0205916 A1* | 8/2013 | Kodama | A63B 24/0062 73/862.69 |
| 2013/0210583 A1* | 8/2013 | Kametani | A63B 24/0062 482/8 |
| 2014/0070930 A1* | 3/2014 | Hara | B62M 25/00 340/432 |

\* cited by examiner

*Primary Examiner* — Edwin A Young
(74) *Attorney, Agent, or Firm* — Mori & Ward, LLP

(57) ABSTRACT

A bicycle setting calculating system comprises a drive-train calculating device. The drive-train calculating device is configured to calculate reference drive-train information as a reference for a setting of a drive train based on bicycle information and rider information. The bicycle information relates to a bicycle configured to be equipped with the drive train. The rider information relates to a rider who is to ride the bicycle.

16 Claims, 12 Drawing Sheets

| DRIVE-TRAIN-COMPONENT GROUP G1 |||||| 
|---|---|---|---|---|---|
| TOTAL NUMBER OF TEETH ||||||
| FRONT SPROCKET ASSEMBLY ||| REAR SPROCKET ASSEMBLY |||
| TYPE | HIGHEST | LOWEST | TYPE | HIGHEST | LOWEST |
| F11 | 55 | 42 | R11 | 12 | 28 |
| F12 | 54 | 42 | R12 | 11 | 28 |
| F13 | 53 | 39 | R13 | 12 | 25 |
| F14 | 52 | 38 | R14 | 11 | 25 |
| F15 | 52 | 36 | R15 | 12 | 23 |
| F16 | 50 | 34 | R16 | 11 | 23 |

| SELECTABLE GEAR RATIOS Gs |||||||
|---|---|---|---|---|---|---|
| | | FRONT LOWEST GEAR |||||
| | | 34 | 36 | 38 | 39 | 42 |
| REAR LOWEST GEAR | 23 | 1.478 | 1.565 | 1.652 | 1.696 | 1.826 |
| | 25 | 1.360 | 1.440 | 1.520 | 1.560 | 1.680 |
| | 28 | 1.214 | 1.286 | 1.357 | 1.393 | 1.500 |

DRIVE-TRAIN-COMPONENT GROUP G1

18a

B3 ↶

W71, W72

RECOMMENDED GEAR RATIOS

| | | FRONT LOWEST GEAR | | | |
|---|---|---|---|---|---|
| | | 34 | 36 | 38 | 39 | 42 |
| REAR LOWEST GEAR | 23 | 1.478 | 1.565 | 1.652 | 1.696 | 1.826 |
| | 25 | 1.360 | 1.440 | 1.520 | 1.560 | 1.680 |
| | 28 | 1.214 | 1.286 | 1.357 | 1.393 | 1.500 |

RECOMMENDED COMBINATIONS

| FRONT | REAR |
|---|---|
| 55-42 | 11-28 |
| 55-42 | 12-28 |
| 54-42 | 11-28 |
| 54-42 | 12-28 |
| 53-39 | 11-28 |
| 53-39 | 12-28 |

| FRONT | REAR |
|---|---|
| 52-38 | 11-28 |
| 52-38 | 12-28 |
| 52-36 | 11-25 |
| 52-36 | 12-25 |
| 52-36 | 11-28 |
| 52-36 | 12-28 |

| FRONT | REAR |
|---|---|
| 50-34 | 11-23 |
| 50-34 | 12-23 |
| 50-34 | 11-25 |
| 50-34 | 12-25 |
| 50-34 | 11-28 |
| 50-34 | 12-28 |

RECOMMENDED GEAR RATIOS

| REAR LOWEST GEAR | FRONT LOWEST GEAR | | | |
|---|---|---|---|---|
| | 34 | 36 | 39 | |
| 23 | 1.478 | 1.565 | 1.696 | |
| 25 | 1.360 | 1.440 | 1.560 | |
| 28 | 1.214 | 1.286 | 1.393 | |
| 32 | 1.063 | 1.125 | 1.219 | |

W81

RECOMMENDED COMBINATIONS

| FRONT | REAR |
|---|---|
| 53-39 | 11-28 |
| 53-39 | 11-32 |
| 52-36 | 11-25 |
| 52-36 | 12-25 |
| 52-36 | 11-28 |
| 52-36 | 11-32 |

| FRONT | REAR |
|---|---|
| 50-34 | 11-23 |
| 50-34 | 11-25 |
| 50-34 | 12-25 |
| 50-34 | 11-28 |
| 50-34 | 11-32 |

| FRONT | REAR |
|---|---|
| 46-36 | 11-25 |
| 46-36 | 12-25 |
| 46-36 | 11-28 |
| 46-36 | 11-32 |

W82

DRIVE-TRAIN-COMPONENT GROUP G2

BICYCLE SETTING CALCULATING SYSTEM, METHOD OF CALCULATING BICYCLE SETTING, AND COMPUTER-READABLE STORAGE MEDIUM

BACKGROUND OF THE INVENTION

Field of the Invention

The present invention relates to a bicycle setting calculating system, a method of calculating a bicycle setting, and a computer-readable storage medium.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle transmission system.

The bicycle transmission system includes, for example, a front chainring and a cassette sprocket. At least one of the front chainring and the cassette sprocket includes multiple shift positions configured to provide gear ratios suitable for rider's physical level and/or environmental conditions during pedaling. Furthermore, various kinds of front chainrings and cassette sprockets have been known that are configured to provide various combinations of gear ratios suitable for the rider's physical levels and/or the environmental conditions.

SUMMARY OF THE INVENTION

In accordance with a first aspect of the present invention, a bicycle setting calculating system comprises a drive-train calculating device. The drive-train calculating device is configured to calculate reference drive-train information as a reference for a setting of a drive train based on bicycle information and rider information. The bicycle information relates to a bicycle configured to be equipped with the drive train. The rider information relates to a rider who is to ride the bicycle.

In accordance with a second aspect of the present invention, the bicycle setting calculating system according to the first aspect is configured so that the rider information includes sustainable power for the rider. The drive-train calculating device is configured to calculate the reference drive-train information based on the sustainable power and the bicycle information.

In accordance with a third aspect of the present invention, the bicycle setting calculating system according to the second aspect is configured so that the rider information includes target cadence for the rider. The drive-train calculating device is configured to calculate the reference drive-train information based on the sustainable power, the target cadence and the bicycle information.

In accordance with a fourth aspect of the present invention, the bicycle setting calculating system according to the third aspect is configured so that the reference drive-train information includes target gear ratio with which the target cadence is maintained during pedaling. The drive-train calculating device includes a target gear-ratio calculator configured to calculate the target gear ratio as the reference drive-train information based on the sustainable power, the target cadence and the bicycle information.

In accordance with a fifth aspect of the present invention, the bicycle setting calculating system according to the fourth aspect is configured so that the bicycle information includes predetermined selectable gear ratios of the bicycle. The gear-ratio selector is configured to select at least one most recommended gear ratio equal to the target gear ratio from the predetermined selectable gear ratios of the drive train if the predetermined selectable gear ratios include at least one gear ratio equal to the target gear ratio. The gear-ratio selector is configured to select at least one most recommended gear ratio closest to and less than the target gear ratio from the predetermined selectable gear ratios of the drive train if the predetermined selectable gear ratios are different from the target gear ratio.

In accordance with a sixth aspect of the present invention, the bicycle setting calculating system according to the fourth aspect is configured so that the bicycle information includes predetermined selectable gear ratios of the bicycle. The drive-train calculating device includes a gear-ratio selector configured to select at least one recommended gear ratio equal to or less than the target gear ratio from the predetermined selectable gear ratios of the bicycle.

In accordance with a seventh aspect of the present invention, the bicycle setting calculating system according to the sixth aspect is configured so that the bicycle information includes component information relating to potential drive-train-component groups each including potential drive-train components each configured to be provided in the drive train. Each of the potential drive-train components has gear ratios. Each of the predetermined selectable gear ratios comprises a minimum gear ratio among the gear ratios of each of the potential drive-train components.

In accordance with an eighth aspect of the present invention, the bicycle setting calculating system according to the seventh aspect further comprises a component selector via which a drive-train-component group is selected from the potential drive-train-component groups. The gear-ratio selector is configured to select the at least one recommended gear ratio equal to or less than the target gear ratio from the predetermined selectable gear ratios of the drive-train-component group selected via the component selector.

In accordance with a ninth aspect of the present invention, the bicycle setting calculating system according to the sixth aspect is configured so that the bicycle information includes component information relating to front sprocket assemblies and rear sprocket assemblies configured to be provided in the drive train. The gear-ratio selector is configured to select at least one recommended combination from combinations of the front sprocket assemblies and the rear sprocket assemblies based on the at least one recommended gear ratio.

In accordance with a tenth aspect of the present invention, the bicycle setting calculating system according to the ninth aspect further comprises a display controller configured to control a display device to display the at least one recommended combination selected by the gear-ratio selector.

In accordance with an eleventh aspect of the present invention, the bicycle setting calculating system according to the sixth aspect further comprises a display controller configured to control a display device to display the at least one recommended gear ratio selected by the gear-ratio selector.

In accordance with a twelfth aspect of the present invention, the bicycle setting calculating system according to the first aspect further comprises a display controller configured to control a display device to display the reference drive-train information calculated by the drive-train calculating device.

In accordance with a thirteenth aspect of the present invention, the bicycle setting calculating system according to the first aspect further comprises an information input device via which the rider information and the bicycle information are inputted.

In accordance with a fourteenth aspect of the present invention, the bicycle setting calculating system according to the first aspect is configured so that the drive-train calculating device is configured to calculate the reference drive-train information based on the rider information, the bicycle information, and environmental information relating to environment under which the rider is to ride the bicycle.

In accordance with a fifteenth aspect of the present invention, the bicycle setting calculating system according to the fourteenth aspect is configured so that the environmental information includes road-grade information relating to road grade of a course on which the rider is to ride the bicycle. The drive-train calculating device is configured to calculate the reference drive-train information based on the rider information, the bicycle information and the road-grade information.

In accordance with a sixteenth aspect of the present invention, the bicycle setting calculating system according to the fifteenth aspect is configured so that the road-grade information includes a maximum road grade of the course on which the rider is to ride the bicycle. The drive-train calculating device is configured to calculate the reference drive-train information based on the rider information, the bicycle information and the maximum road grade.

In accordance with a seventeenth aspect of the present invention, a method of calculating a bicycle setting comprises calculating reference drive-train information as a reference for a setting of a drive train based on bicycle information and rider information. The bicycle information relates to a bicycle configured to be equipped with the drive train. The rider information relates to a rider who is to ride the bicycle.

In accordance with an eighteenth aspect of the present invention, a computer-readable storage medium stores a program for causing a computer to execute a process comprising calculating reference drive-train information as a reference for a setting of a drive train based on bicycle information and rider information. The bicycle information relates to a bicycle configured to be equipped with the drive train. The rider information relates to a rider who is to ride the bicycle.

In accordance with a nineteenth aspect of the present invention, a bicycle setting calculating system comprises a reference-cadence calculating device configured to calculate maximum sustainable cadence for a rider based on bicycle information and rider information. The bicycle information relates to a drive train of a bicycle. The rider information relates to the rider who is to ride the bicycle.

In accordance with a twentieth aspect of the present invention, the bicycle setting calculating system according to the nineteenth aspect is configured so that the rider information includes sustainable power for the rider. The bicycle information includes a current gear ratio of the bicycle. The reference-cadence calculating device includes a reference cadence calculator configured to calculate the maximum sustainable cadence based on the sustainable power and the current gear ratio.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic diagram showing one example of a drive-train-component group stored in a bicycle-information storing device of the bicycle setting calculating system illustrated in FIG. 2;

FIG. 8 is a schematic diagram showing another example of the display screen of the display device provided in the bicycle setting calculating system illustrated in FIG. 2;

FIG. 9 is a schematic diagram showing another example of the display screen of the display device provided in the bicycle setting calculating system illustrated in FIG. 2;

DESCRIPTION OF THE EMBODIMENTS

Figure 1:
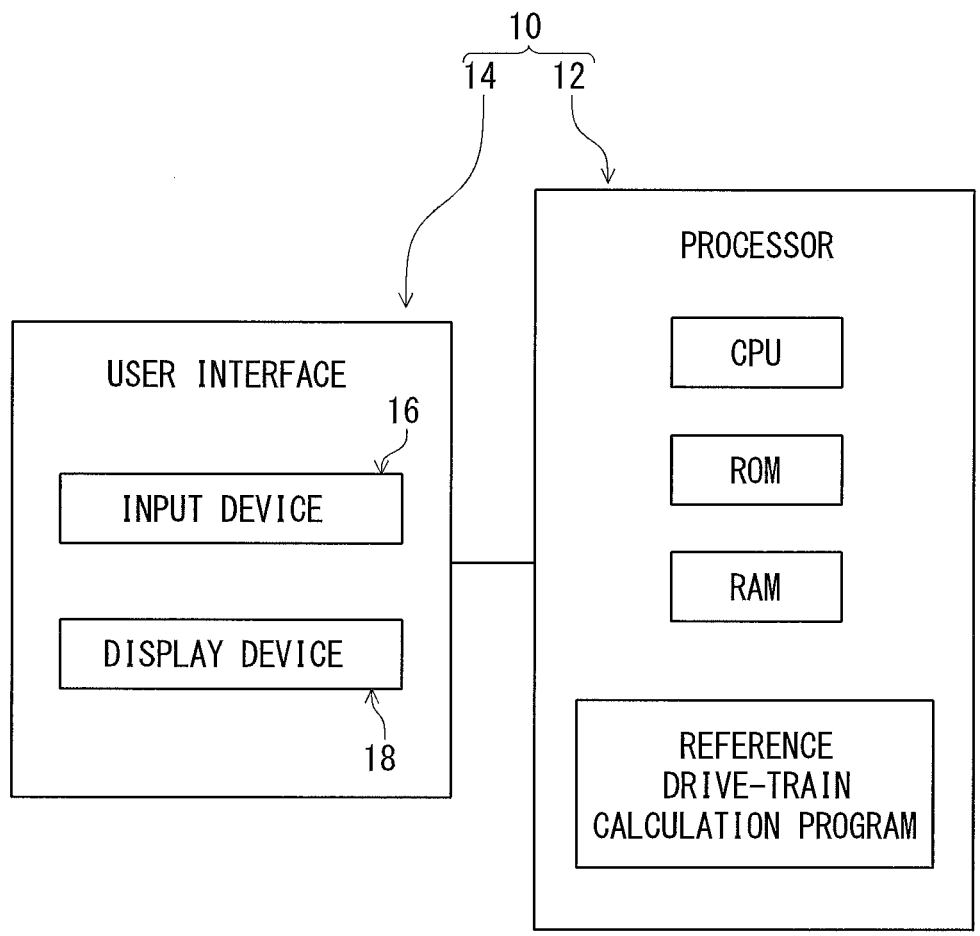
FIG. 1 is a schematic block diagram showing an outline of a bicycle setting calculating system in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle setting calculating system 10 in accordance with a first embodiment is illustrated. The bicycle setting calculating system 10 is configured to provide a user (e.g., a rider) with a recommended bicycle setting for the bicycle fitting. In the first embodiment, the bicycle setting calculating system 10 is performed using hardware and software. Possible examples of the hardware include a computer. For example, the bicycle setting calculating system 10 includes a processor 12 and a user interface 14. The processor 12 is equipped with a central processing unit (CPU), a read only memory (ROM), and a random access memory (RAM). The software is installed in the processor 12. The user interface 14 is electrically connected to the processor 12 and includes an input device 16 and a display device 18. Possible examples of the bicycle setting calculating system 10 include a personal computer, a cyclocomputer and a mobile device such as a smartphone. Possible examples of the input device 16 include a keyboard, a mouse and a touch panel.

A reference drive-train calculation program is stored in the ROM, and the program is read into the CPU to perform functions of the bicycle setting calculating system 10. More specifically, a computer-readable storage medium (e.g., the ROM) stores the program for causing the computer to execute a process comprising calculating reference drive-train information as a reference for a setting of a drive train based on bicycle information and rider information.

Figure 2:
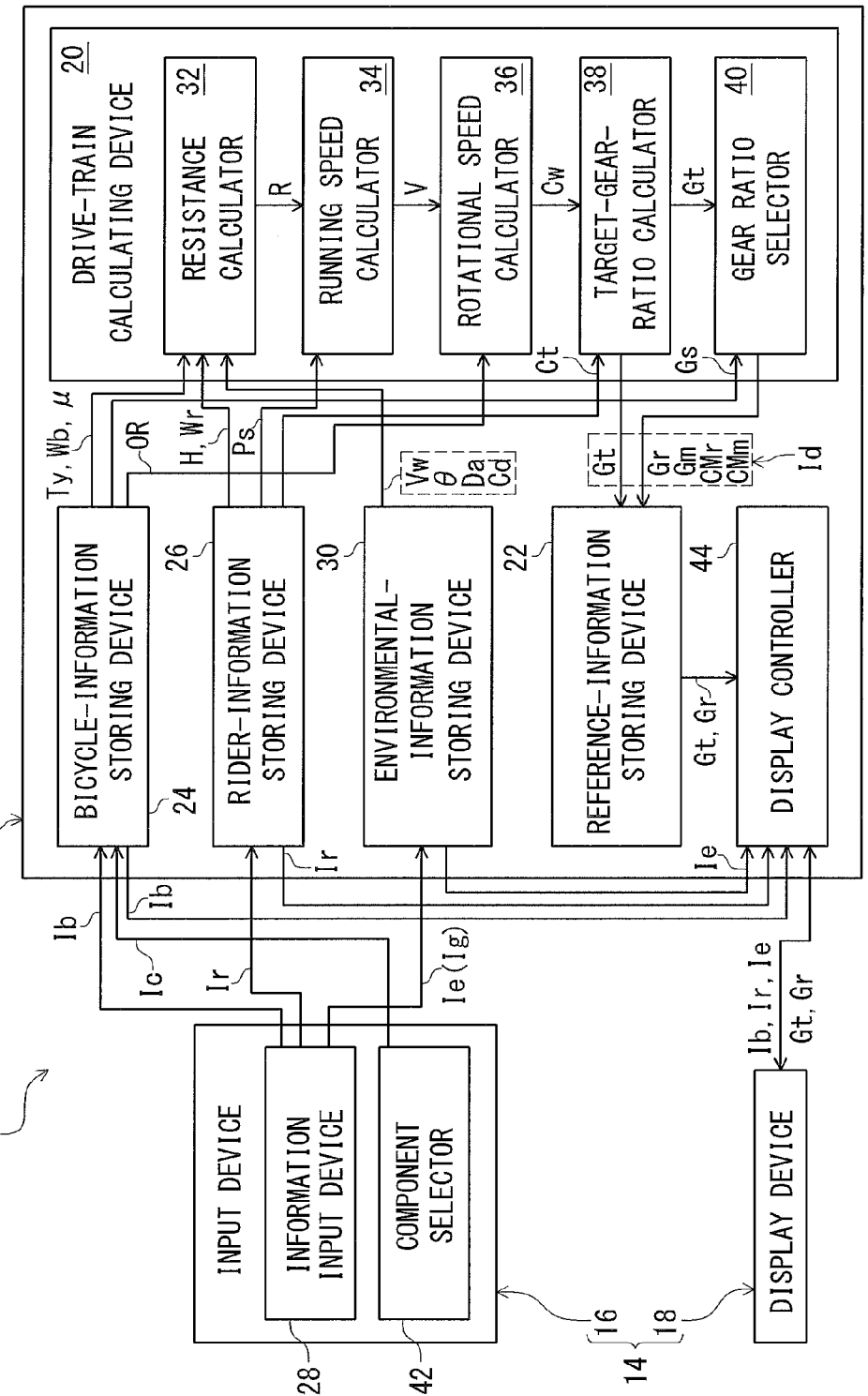
FIG. 2 is a block diagram of the bicycle setting calculating system illustrated in FIG. 1.

As seen in FIG. 2, the bicycle setting calculating system 10 comprises a drive-train calculating device 20. The drive-train calculating device 20 is one of functional blocks performed by the reference drive-train calculation program (FIG. 1). The drive-train calculating device 20 is configured to calculate reference drive-train information Id as a reference for a setting of a drive train based on bicycle information Ib and rider information Ir. For example, the drive train includes a front sprocket assembly (e.g., a front chainring), a rear sprocket assembly (e.g., a cassette sprocket), and a chain configured to engage with the front sprocket assembly and the rear sprocket assembly. Possible examples of the setting of the drive train include selecting at least one of the front sprocket assembly and the rear sprocket assembly. The bicycle setting calculating system 10 includes a reference-information storing device 22 configured to store the reference drive-train information Id. For example, the reference-information storing device 22 can be performed by the RAM and/or the ROM.

The bicycle information Ib relates to a bicycle configured to be equipped with the drive train. For example, the bicycle information Ib includes predetermined selectable gear ratios Gs of the bicycle. For example, the predetermined selectable gear ratios Gs are gear ratios performed by potential drive trains which are configured to be mounted to the bicycle.

The bicycle information Ib further includes a type of the bicycle Ty, weight Wb of the bicycle, an outer radius OR of a wheel (e.g., a rear wheel), and coefficient of rolling resistance $\mu$. Possible examples of the type of the bicycle Ty include a road bike and a mountain bike. The bicycle setting calculating system 10 includes a bicycle-information storing device 24 configured to store the bicycle information Ib. For example, the bicycle-information storing device 24 can be performed by the RAM and/or the ROM.

The rider information Ir relates to a rider who is to ride the bicycle. The rider information Ir includes sustainable power Ps for the rider. For example, the sustainable power Ps is maximum average power that a rider can sustain per one hour. Possible examples of the sustainable power Ps include functional threshold power (FTP). The sustainable power Ps can be obtained using Coggan power zones, Ric Sterm Training zones, and critical power zones, for example.

The rider information Ir includes target cadence Ct for the rider. The target cadence Ct is a calculated cadence of when the rider sustains power equal to the sustainable power Ps. The rider information Ir further includes height H of the rider and weight Wr of the rider. The bicycle setting calculating system 10 includes a rider-information storing device 26 configured to store the rider information Ir. For example, the rider-information storing device 26 can be performed by the RAM and/or the ROM.

The bicycle setting calculating system 10 further comprises an information input device 28 via which the rider information Ir and the bicycle information Ib are inputted. The user inputs the environmental information Ie via the information input device 28. The information input device 28 is provided in the input device 16 as the user interface.

For example, the user (e.g., the rider) inputs at least one of the predetermined selectable gear ratios Gs, the type of the bicycle Ty, the weight Wb of the bicycle, and the outer radius OR of the rear wheel using the information input device 28. The user (e.g., the rider) inputs at least one of the sustainable power Ps, the target cadence Ct, the height H of the rider, and the weight Wr of the rider using the information input device 28.

The drive-train calculating device 20 is configured to calculate the reference drive-train information Id based on the sustainable power Ps and the bicycle information Ib. More specifically, the drive-train calculating device 20 is configured to calculate the reference drive-train information Id based on the sustainable power Ps, the target cadence Ct and the bicycle information Ib.

In the illustrated embodiment, the drive-train calculating device 20 is configured to calculate the reference drive-train information Id based on the rider information Ir, the bicycle information Ib, and environmental information Ie. The environmental information Ie can, however, be omitted from information used to calculating the reference drive-train information if needed and/or desired. The environmental information Ie relates to environment under which the rider is to ride the bicycle. The environmental information Ie includes road-grade information Ig relating to road grade of a course on which the rider is to ride the bicycle. The drive-train calculating device 20 is configured to calculate the reference drive-train information Id based on the rider information Ir, the bicycle information Ib and the road-grade information Ig.

The road-grade information Ig includes a maximum road grade $\theta$ of the course on which the rider is to ride the bicycle. The drive-train calculating device 20 is configured to calculate the reference drive-train information Id based on the rider information Ir, the bicycle information Ib and the maximum road grade $\theta$. The road-grade information Ig can include an average road grade of the course instead of or in addition to the maximum road grade $\theta$. The environmental information Ie further includes the course (e.g., a name of the course or a route of the course), an atmosphere temperature T of the course, a speed of a head wind Vw, a road condition of the course, air density Da, and coefficient of air resistance Cd. For example, the atmosphere temperature T can be used to calculate the air density Da and/or the coefficient of air resistance Cd. However, at least one of the air density Da and the coefficient of air resistance Cd can be a constant. In this case, the atmosphere temperature T can be omitted from the environmental information Ie if needed and/or desired.

The user (e.g., the rider) inputs at least one of the maximum road grade $\theta$, the course, the atmosphere temperature T, the speed of the head wind Vw, the road condition, the air density Da, and coefficient of air resistance Cd using the information input device 28. The bicycle setting calculating system 10 includes an environmental-information storing device 30 configured to store the environmental information Ie. For example, the environmental-information storing device 30 can be performed by the RAM and/or the ROM.

The drive-train calculating device 20 includes a resistance calculator 32, a running speed calculator 34, a rotational speed calculator 36, and a target-gear-ratio calculator 38. The resistance calculator 32, the running speed calculator 34, the rotational speed calculator 36, and the target-gear-ratio calculator 38 are functional blocks performed by the reference drive-train calculation program (FIG. 1) stored in the ROM.

The resistance calculator 32 is configured to calculate running resistance R of the bicycle based on the bicycle information Ib, the rider information Ir and the environmental information Ie. More specifically, the resistance calculator 32 is configured to calculate rolling resistance Rr based on the following formula (1).

$$Rr=(Wr+Wb) \times g \times \mu \qquad (1)$$

The constant "g" represents acceleration of gravity.

The resistance calculator 32 is configured to calculate air resistance Ra based on the following formula (2).

$$Ra=1/2 \times Da \times Cd \times A \times (V+Vw)^2 \qquad (2)$$

The variable "A" represents a total front projected area of the rider and the bicycle. For example, the total front projected area A is calculated based on the height H of the rider and the type of the bicycle Ty. However, the total front projected area A can be a constant if needed and/or desired. The variable "V" represents a running speed of the bicycle.

The resistance calculator 32 is configured to calculate grade resistance Rg based on the following formula (3).

$$Rg=(Wr+Wb) \times g \times \sin \theta \qquad (3)$$

The resistance calculator 32 is configured to calculate the running resistance R based on the following formula (4).

$$R=Rr+Ra+Rg \qquad (4)$$

The running speed calculator 34 is configured to calculate the running speed V of the bicycle based on the running resistance R and the rider information Ir. More specifically, the running speed calculator 34 is configured to calculate the running speed V based on the running resistance R and the sustainable power Ps. The running speed V indicates a running speed at which the rider can ride the bicycle on a road having the maximum road grade θ while keeping the sustainable power Ps. The running speed calculator 34 is configured to calculate the running speed V based on the above formulas (1) to (4) and the following formula (5).

$$V=Ps/R \qquad (5)$$

The rotational speed calculator 36 is configured to calculate a wheel rotational speed Cw based on the running speed V and the bicycle information Ib. More specifically, the rotational speed calculator 36 is configured to calculate the wheel rotational speed Cw based on the running speed V and the outer radius OR of the rear wheel. The rotational speed calculator 36 is configured to calculate the wheel rotational speed Cw based on the following formula (6).

$$Cw=(V \times 1000/60)/(OR \times \pi) \qquad (6)$$

The reference drive-train information Id includes target gear ratio Gt with which the target cadence Ct is maintained during pedaling. The drive-train calculating device 20 includes a target-gear-ratio calculator 38 configured to calculate the target gear ratio Gt as the reference drive-train information Id based on the sustainable power Ps, the target cadence Ct and the bicycle information Ib. The target-gear-ratio calculator 38 is configured to calculate the target gear ratio Gt based on the target cadence Ct and the wheel rotational speed Cw which is calculated based on the formulas (5) and (6). The target-gear-ratio calculator 38 is configured to calculate the target gear ratio Gt based on the following formula (7).

$$Gt=Cw/Ct \qquad (7)$$

The drive-train calculating device 20 includes a gear-ratio selector 40 configured to select at least one recommended gear ratio Gr equal to or less than the target gear ratio Gt from the predetermined selectable gear ratios Gs of the bicycle. In the illustrated embodiment, the gear-ratio selector 40 is configured to select at least one most recommended gear ratio Gm equal to the target gear ratio Gt from the predetermined selectable gear ratios Gs of the drive train if the predetermined selectable gear ratios Gs include at least one gear ratio equal to the target gear ratio Gt. The gear-ratio selector 40 is configured to select the at least one most recommended gear ratio Gm closest to and less than the target gear ratio Gt from the predetermined selectable gear ratios Gs of the drive train if the predetermined selectable gear ratios Gs are different from the target gear ratio Gt.

As seen in FIG. 3, the bicycle information Ib includes component information Ic relating to potential drive-train-component groups each including potential drive-train components each configured to be provided in the drive train. Each of the potential drive-train components has gear ratios. The component information Ic relates to front sprocket assemblies and rear sprocket assemblies configured to be provided in the drive train. The component information Ic is stored in the bicycle-information storing device 24.

Figure 4:
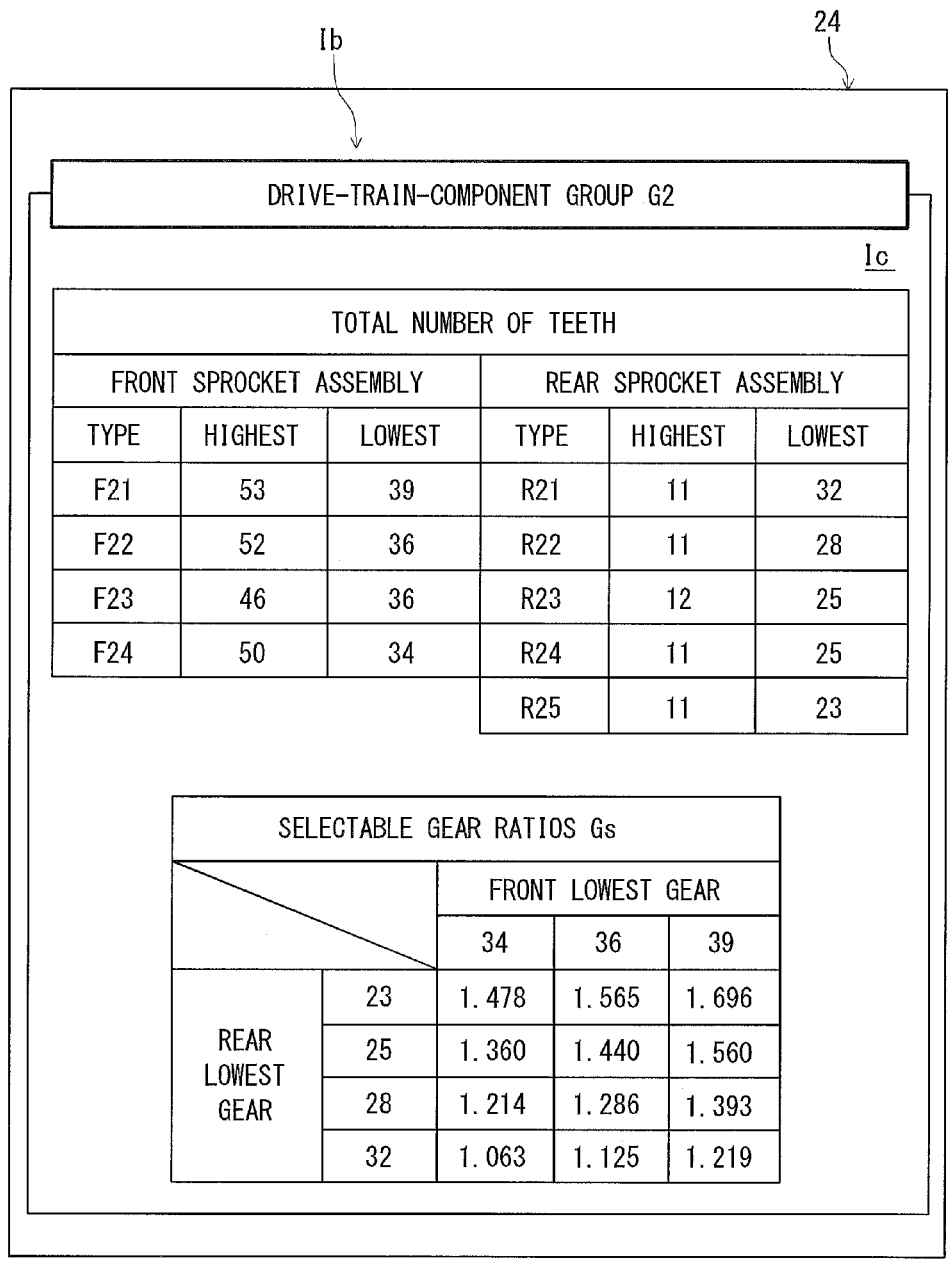
FIG. 4 is a schematic diagram showing another example of the drive-train-component group stored in the bicycle-information storing device of the bicycle setting calculating system illustrated in FIG. 2.

As seen in FIGS. 3 and 4, the component information Ic relates to the potential drive-train-component groups G1 and G2. The potential drive-train-component group G1 includes front sprocket assemblies F11, F12, F13, F14, F15 and F16 and rear sprocket assemblies R11, R12, R13, R14, R15 and R16 as the potential drive-train components. Each of the front sprocket assemblies F11 to F16 includes a highest gear and a lowest gear which have total numbers of teeth listed in FIG. 3. Each of the rear sprocket assemblies R11 to R16 includes a highest gear and a lowest gear which have total numbers of teeth listed in FIG. 3.

As seen in FIG. 3, the component information Ic further includes predetermined selectable gear ratios Gs calculated based on the total numbers of teeth of the lowest gears of the front sprocket assemblies F11 to F16 and the total numbers of teeth of the lowest gears of the rear sprocket assemblies R11 to R 16. In the present application, for example, the gear ratio is calculated by dividing a total number of teeth of a lowest gear of front sprocket assembly by a total number of teeth of a lowest gear of a rear sprocket assembly.

As seen in FIG. 4, the potential drive-train-component group G2 includes front sprocket assemblies F21, F22, F23 and F24 and rear sprocket assemblies R21, R22, R23, R24 and R25 as the potential drive-train components. Each of the front sprocket assemblies F21 to F24 includes a highest gear and a lowest gear which have total numbers of teeth listed in FIG. 4. Each of the rear sprocket assemblies R21 to R25 includes a highest gear and a lowest gear which have total numbers of teeth listed in FIG. 4.

As seen in FIG. 4, the component information Ic further includes predetermined selectable gear ratios Gs calculated based on the total numbers of teeth of the lowest gears of the front sprocket assemblies F21 to F24 and the total numbers of teeth of the lowest gears of the rear sprocket assemblies R21 to R25.

As seen in FIGS. 3 and 4, each of the predetermined selectable gear ratios Gs comprises a minimum gear ratio among the gear ratios of each of the potential drive-train components. The predetermined selectable gear ratios Gs are included in the program stored in the ROM. The predetermined selectable gear ratios Gs can, however, be inputted into the bicycle setting calculating system 10 by the user via the information input device 28 if needed and/or desired. Furthermore, the predetermined selectable gear ratios Gs can be updated using the firmware update if needed and/or desired.

Returning to FIG. 2, the bicycle setting calculating system 10 further comprises a component selector 42 via which a drive-train-component group is selected from the potential drive-train-component groups. The component selector 42 is provided in the input device 16. In the illustrated embodiment, a drive-train-component group is selected from the potential drive-train-component groups G1 and G2 (FIGS. 3 and 4) using the component selector 42. Information relating to which component group is selected is stored in the bicycle-information storing device 24 as the component information Ic. The component information Ic is utilized by the gear-ratio selector 40 to select at least one recommended gear ratio Gr from the predetermined selectable gear ratios Gs.

More specifically, the gear-ratio selector 40 is configured to select the at least one recommended gear ratio Gr equal to or less than the target gear ratio Gt from the predetermined selectable gear ratios Gs of the drive-train-component group selected via the component selector 42. The gear-ratio selector 40 is configured to select at least one recommended combination CMr from combinations of the front sprocket assemblies and the rear sprocket assemblies based on the at least one recommended gear ratio Gr. The recommended combination CMr of a recommended front sprocket assembly and a recommended rear sprocket assembly corresponds the recommended gear ratio Gr calculated based on a lowest gear of the recommended front sprocket assembly and a lowest gear of the recommended rear sprocket assembly.

The bicycle setting calculating system 10 further comprises a display controller 44 configured to control the display device 18 to display the reference drive-train information Id calculated by the drive-train calculating device 20. In the illustrated embodiment, the display controller 44 is configured to control the display device 18 to display the at least one recommended gear ratio Gr selected by the gear-ratio selector 40. Furthermore, the display controller 44 is configured to control the display device 18 to display the at least one recommended combination CMr selected by the gear-ratio selector 40.

The display controller 44 is configured to control the display device 18 to display the target gear ratio Gt calculated by the target-gear-ratio calculator 38. Furthermore, the display controller 44 is configured to control the display device 18 to display the running speed V calculated by the running speed calculator 34. The display controller 44 is configured to control the display device 18 to display the recommended gear ratios Gr selected by the gear-ratio selector 40. The display controller 44 is configured to control the display device 18 to display the recommended combinations CMr of the front sprocket assemblies and the rear sprocket assemblies.

A method of calculating the reference drive-train information Id will be described below referring to FIGS. 5 and 6.

Figure 5:
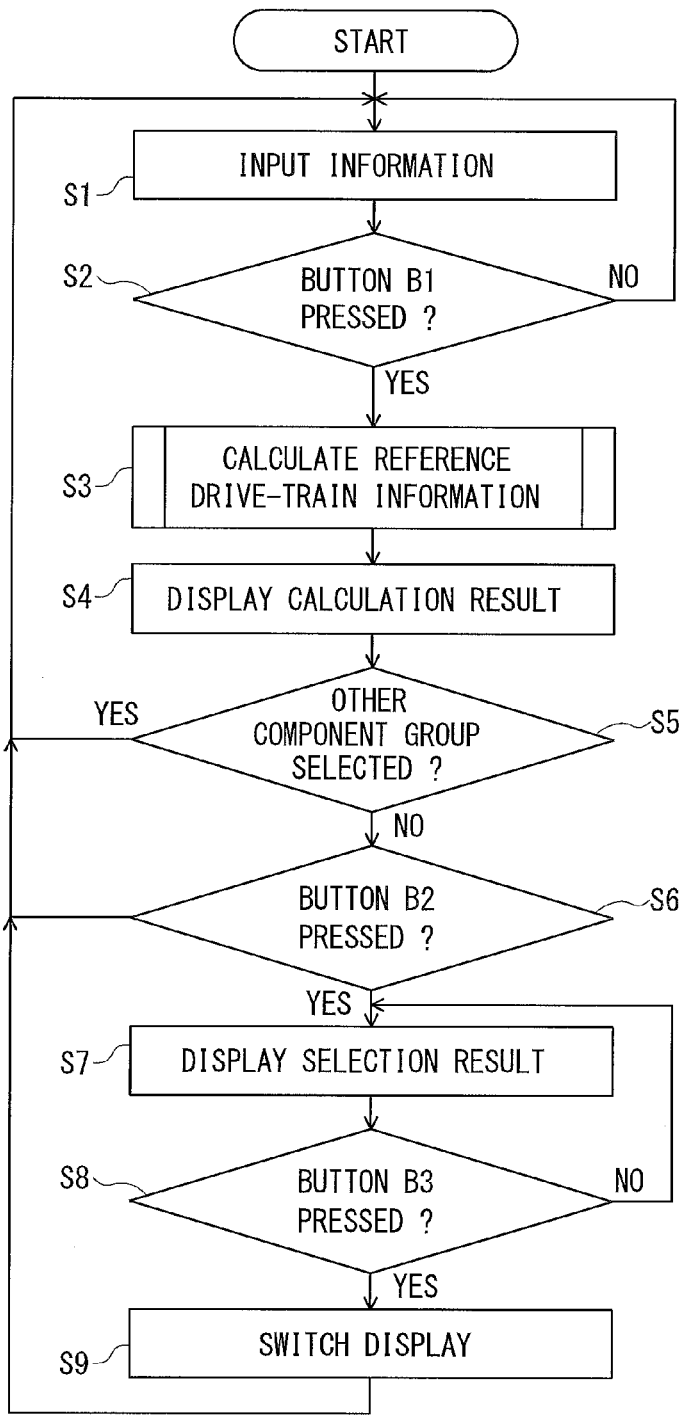
FIG. 5 is a flowchart of a reference drive-train information calculation process performed by the bicycle setting calculating system illustrated in FIG. 2.

As seen in FIG. 5, in step S1, the rider information Ir, the bicycle information Ib, and the environmental information Ie are inputted into the bicycle setting calculating system 10 using the information input device 28. In the illustrated embodiment, as seen in FIG. 7, the height H of the rider, the weight Wr of the rider, the sustainable power Ps, and the target cadence Ct are inputted into the bicycle setting calculating system 10 as the rider information Ir via a rider-information window W1 on a screen 18a of the display device 18.

Figure 7:
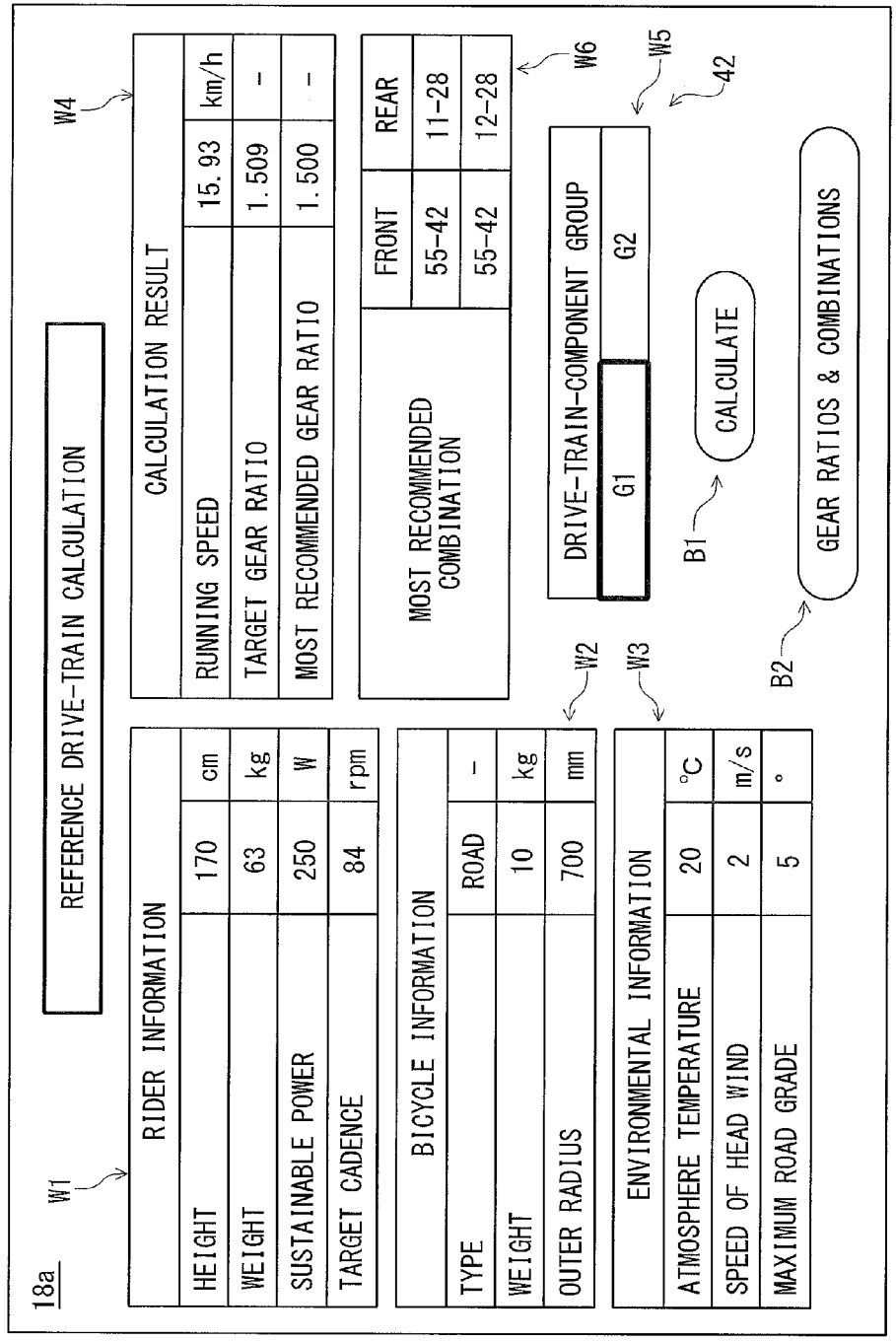
FIG. 7 is a schematic diagram showing one example of a display screen of a display device provided in the bicycle setting calculating system illustrated in FIG. 2.

As seen in FIG. 7, the type of the bicycle, the weight Wb of the bicycle, and the outer radius OR of the rear wheel are inputted into the bicycle setting calculating system 10 as the bicycle information Ib via a bicycle-information window W2 on the screen 18a. The atmosphere temperature, the speed of the head wind, and the maximum road grade are inputted into the bicycle setting calculating system 10 as the environmental information Ie via an environmental-information window W3 on the screen 18a. The information input device 28 (e.g., the keyboard and/or the mouse) is used to input the rider information Ir, the bicycle information Ib and the environmental information Ie.

The method of calculating the bicycle setting comprises calculating reference drive-train information Id as a reference for a setting of a drive train based on the bicycle information Ib and the rider information Ir. For example, in steps S2 and S3, the reference drive-train information Id is calculated when a button B1 (FIG. 7) is pressed (clicked) on the display device 18 using the information input device 28 (e.g., the mouse).

Figure 6:
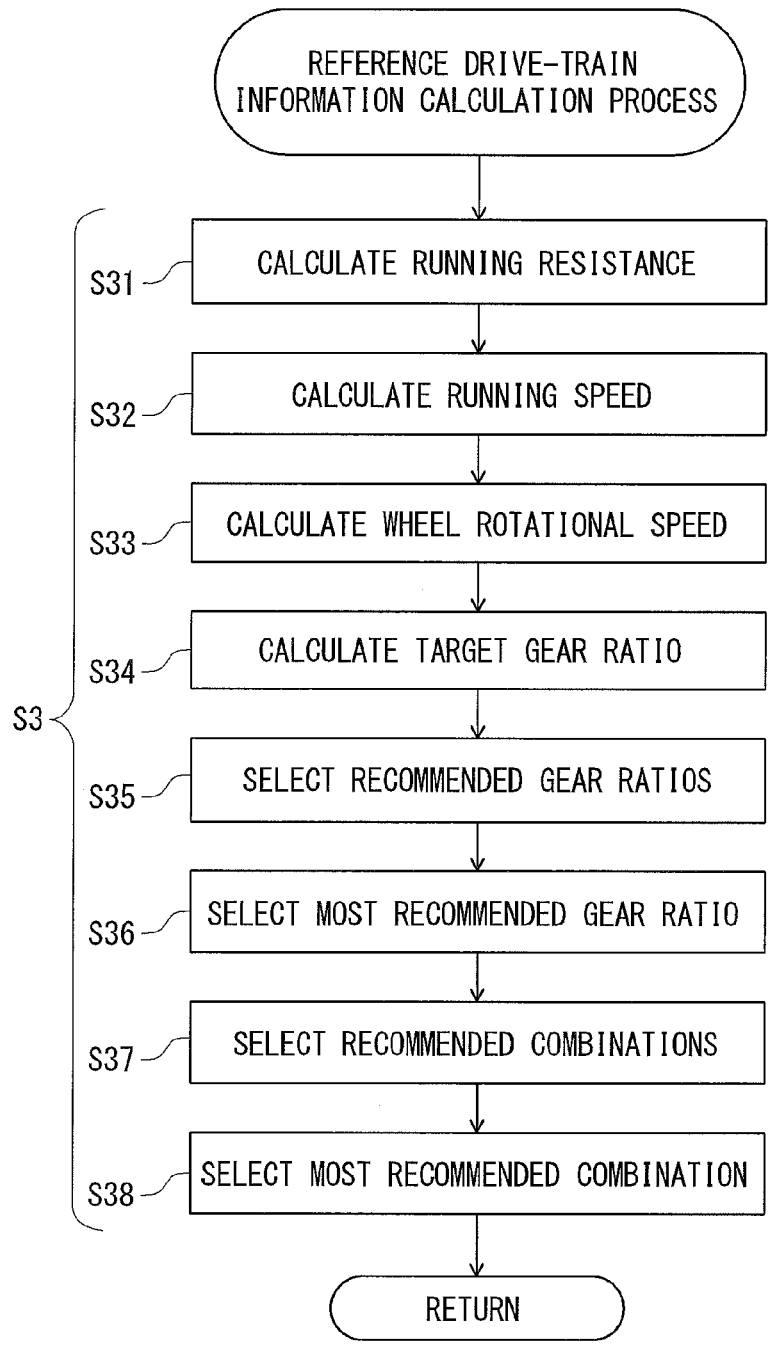
FIG. 6 is a flowchart of a reference drive-train information calculation process performed by the bicycle setting calculating system illustrated in FIG. 2.

As seen in FIG. 6, the step S3 includes steps S31 to S38. In step S31, the running resistance R is calculated by the resistance calculator 32 based on the formulas (1) to (4). In step S32, the running speed V is calculated by the running speed calculator 34 based on the formula (5).

In step S33, the wheel rotational speed Cw is calculated by the rotational speed calculator 36 based on the formula (6). In step S34, the target gear ratio Gt is calculated by the target-gear-ratio calculator 38 based on the formula (7).

In step S35, the recommended gear ratios Gr are selected by the gear-ratio selector 40 from the predetermined selectable gear ratios Gs of the bicycle. More specifically, at least one recommended gear ratios Gr equal to or less than the target gear ratio Gt is selected from the predetermined selectable gear ratios Gs of the bicycle.

In step S36, the most recommended gear ratio Gm is selected by the gear-ratio selector 40 from the predetermined selectable gear ratios Gs. More specifically, the most recommended gear ratio Gm closest to and less than the target gear ratio Gt is selected from the predetermined selectable gear ratios Gs of the drive train if the predetermined selectable gear ratios Gs are different from the target gear ratio Gt.

In step S37, the recommended combinations CMr are selected by the gear-ratio selector 40 from the predetermined selectable gear ratios Gs. More specifically, the recommended combinations CMr corresponding to the recommended gear ratios Gr are selected by the gear-ratio selector 40 from the predetermined selectable gear ratios Gs.

In step S38, the most recommended combination CMm is selected by the gear-ratio selector 40 from the recommended combinations CMr. More specifically, the most recommended combinations CMm corresponding to the most recommended gear ratios Gm are selected by the gear-ratio selector 40 from the recommended combinations CMr.

As seen in FIG. 5, in step S4, the calculation results are displayed on the screen 18a of the display device 18 by the display controller 44. In the illustrated embodiment, as seen in FIG. 7, the running speed V, the target gear ratio Gt, the recommended gear ratios Gr, the most recommended gear ratio Gm, the recommended combinations CMr and the most recommended combination CMm are displayed on the display device 18 by the display controller 44.

As seen in FIG. 7, for example, the running speed V, the target gear ratio Gt, and the most recommended gear ratio Gm are displayed in a calculation result window W4 on the screen 18a of the display device 18.

In the illustrated embodiment, the component selector 42 is displayed on the screen 18a as a component-group selection window W5. One of the drive-train-component groups G1 and G2 can be selected by the user via the component-group selection window W5. In the illustrated embodiment, the drive-train-component group G1 is selected by the user via the component-group selection window W5.

As seen in FIG. 7, the most recommended combination CMm of the front sprocket assembly and the rear sprocket assembly which are included in the selected drive-train-component group G1 are displayed in a recommended combination window W6 on the screen 18a. In the illustrated embodiment, the combination of the front sprocket assembly F11 (FIG. 3) and the rear sprocket assembly R12 (FIG. 3) is displayed in the recommended combination window W6. Furthermore, the combination of the front sprocket assembly F11 (FIG. 3) and the rear sprocket assembly R11 (FIG. 3) is displayed in the recommended combination window W6. When the drive-train-component group G2 is selected, the recommended gear ratio Gr and the recommended combinations CMr of the drive-train-component group G2 are displayed in the recommended combination window W6 on the screen 18a.

As seen in FIG. 5, in step S5, the process returns to step S1 in a case where the other drive-train-component group is selected via the component-group selection window W5 (FIG. 7). The process enters step S6 in a case where the same drive-train-component group is selected via the component-group selection window W5 (FIG. 7).

In step S6, the process returns to step S1 in a case where a button B2 (FIG. 7) is not pressed (clicked) by the user. In steps S6 and S7, the recommended gear ratios Gr and the recommended combinations CMr are displayed on the display device 18 in a case where a button B2 (FIG. 7) is pressed (clicked) by the user.

For example, when the button B2 (FIG. 7) is pressed (clicked) by the user in a state where the drive-train-component group G1 is selected in the component-group selection window W5, the recommended gear ratios Gr and the recommended combinations CMr selected based on the drive-train components of the drive-train-component group G1 are displayed on the screen 18a. More specifically, as seen FIG. 8, the recommended gear ratios Gr and the recommended combinations CMr selected based on the drive-train components of the drive-train-component group G1 are displayed in an upper window W71 on the screen 18a. In the illustrated embodiment, the recommended gear ratios Gr equal to or less than the target gear ratio Gt (e.g., 1.509) are surrounded with thick lines. The recommended combinations CMr corresponding to the recommended gear ratios Gr are displayed in a lower window W72 on the screen 18a. The user can select a preferable gear ratio for the rider with reference to the recommended gear ratios Gr and the recommended combinations CMr which are displayed on the screen 18a of the display device 18.

When the button B2 (FIG. 7) is pressed (clicked) by the user in a state where the drive-train-component group G2 is selected in the component-group selection window W5, the recommended gear ratios Gr and the recommended combinations CMr selected based on the drive-train components of the drive-train-component group G2 are displayed on the screen 18a. More specifically, as seen in FIG. 9, the recommended gear ratios Gr and the recommended combinations CMr selected based on the drive-train components of the drive-train-component group G2 are displayed in an upper window W81. The recommended gear ratios Gr equal to or less than the target gear ratio Gt are surrounded with thick lines. The recommended combinations CMr corresponding to the recommended gear ratios Gr are displayed in a lower window W82. The user can select a preferable gear ratio for the rider with reference to the recommended gear ratios Gr and the recommended combinations CMr which are displayed on the screen 18a of the display device 18.

In steps 7 and 8, the recommended gear ratios Gr and the recommended combinations CMr are displayed on the display device 18 until a button B3 (FIG. 8 or 9) is pressed (clicked) by the user. In steps S8 and S9, the display screen is switched from a selection result screen illustrated in FIG. 8 or 9 to a main screen illustrated in FIG. 7, and the process returns to step S1.

With the bicycle setting calculating system 10, since the drive-train calculating device 20 is configured to calculate the reference drive-train information Id as a reference for a setting of a drive train based on the bicycle information Ib and the rider information Ir, it is possible to provide the user (e.g., the rider) with the recommended bicycle setting which is preferable to ride the bicycle under a specific condition. This allows the bicycle to be fitted to the specific condition for efficiently improving pedaling for the rider.

Examples of the display screens illustrated in FIGS. 7 to 9 are not limited to the illustrated embodiment. Layouts in the display screens can be arranged in accordance with the configurations of the bicycle setting calculating system 10.

Second Embodiment

A bicycle setting calculating system 210 in accordance with a second embodiment will be described below referring to FIGS. 10 to 12. The bicycle setting calculating system 210 has substantially the same configuration as the bicycle setting calculating system 10 except for the drive-train calculating device. Thus, elements having substantially the same function as those in the first embodiment will be numbered the same here, and will not be described and/or illustrated again in detail here for the sake of brevity.

Figure 10:
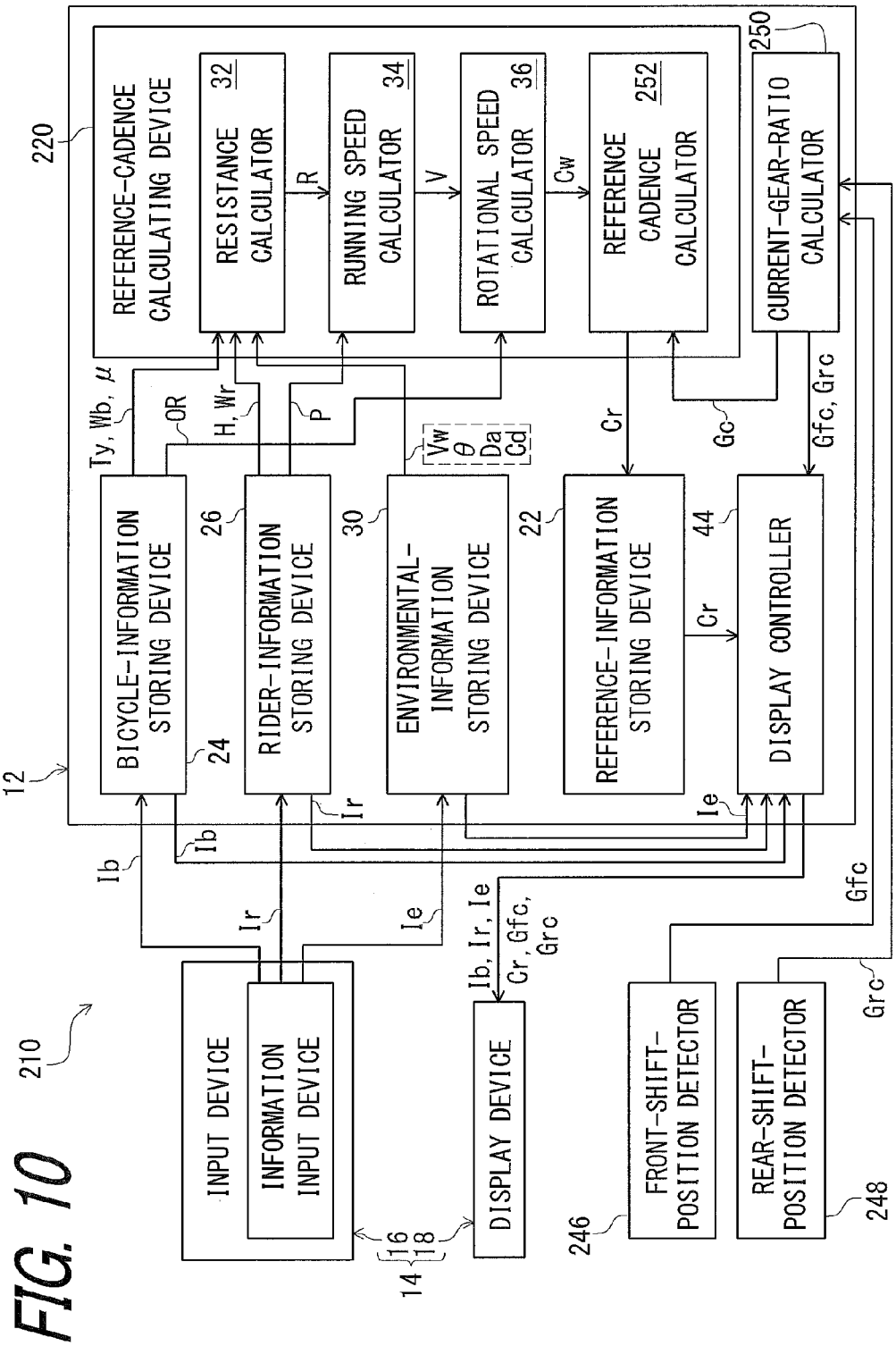
FIG. 10 is a block diagram of a bicycle setting calculating system in accordance with a second embodiment.

As seen in FIG. 10, the reference-cadence calculating device 220 includes the resistance calculator 32, the running speed calculator 34, and the rotational speed calculator 36 as well as the drive-train calculating device 20 in accordance with the first embodiment. In the illustrated embodiment, the bicycle setting calculating system 210 is applied to a cyclocomputer, for example. The bicycle setting calculating system 210 can, however, be applied to devices other than the cyclocomputer. Possible examples of the bicycle setting calculating system 10 include a mobile device such as a smartphone.

The bicycle setting calculating system 210 comprises a reference-cadence calculating device 220 instead of the target-gear-ratio calculator 38 and the gear-ratio selector 40. The reference-cadence calculating device 220 is configured to calculate maximum sustainable cadence Cmax for a rider based on the bicycle information Ib and the rider information Ir.

The rider information Ir relates to the rider who is to ride the bicycle. The rider information Ir includes the sustainable power Ps for the rider. The bicycle information Ib relates to a drive train of a bicycle. The bicycle information Ib includes a current gear ratio of the bicycle.

More specifically, a front-shift-position detector 246 and a rear-shift-position detector 248 are mounted to the bicycle. The front-shift-position detector 246 is configured to detect a current front shift position SPf selected in a front transmission (e.g., a front derailleur). The front-shift-position detector 246 is configured to periodically transmit the current front shift position SPf to the bicycle setting calculating system 210. The rear-shift-position detector 248 is configured to detect a current rear shift position SPr selected in a rear transmission (e.g., a rear derailleur). The rear-shiftposition detector 248 is configured to periodically transmit the current rear shift position SPr to the bicycle setting calculating system 210. For example, the front-shift-position detector 246 is provided in the front transmission, and the rear-shift-position detector 248 is provided in the rear transmission.

As seen in FIG. 10, the reference-cadence calculating device 220 includes a current-gear-ratio calculator 250 configured to calculate a current gear ratio Gc based on the current front shift position SPf and the current rear shift position SPr based on the formula (8).

$$Gc = SPf/SPr \quad (8)$$

The reference-cadence calculating device 220 includes a reference cadence calculator 252 configured to calculate the maximum sustainable cadence based on the sustainable power Ps and the current gear ratio Gc. More specifically, the reference cadence calculator 252 is configured to calculate the maximum sustainable cadence based on the wheel rotational speed Cw and the current gear ratio Gc based on the formula (9).

$$Cmax = Cw/Gc \quad (9)$$

As discussed in the first embodiment, since the wheel rotational speed Cw is calculated based on the formulas (5) and (6), it can be said that the reference cadence calculator 252 is configured to calculate the maximum sustainable cadence Cmax based on the sustainable power Ps and the current gear ratio Gc. The maximum sustainable cadence Cmax is stored in the reference-information storing device 22. The display controller 44 is configured to control the display device 18 to display the maximum sustainable cadence Cmax. The display controller 44 is further configured to control the display device 18 to display the current front shift position SPf and the current rear shift position SPr.

A method of calculating a maximum sustainable cadence will be described below referring to FIGS. 11 and 12. The operation steps such as steps S2, S5, S6 and S8 of the first embodiment are omitted from the flowchart of FIG. 11. Such steps can be applied to the flowchart of FIG. 11 if needed and/or desired.

Figure 11:
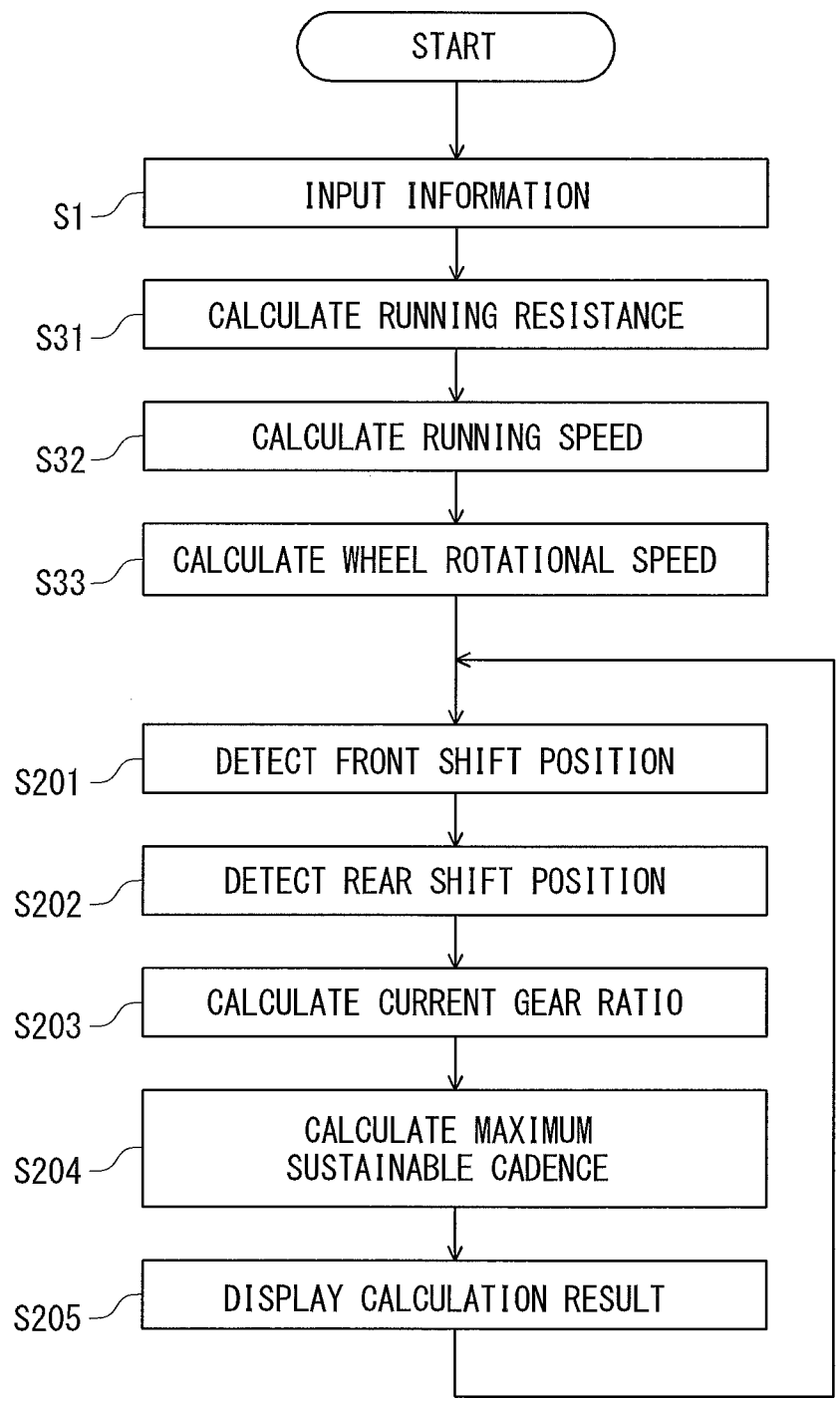
FIG. 11 is a flowchart of a reference cadence calculation process performed by the bicycle setting calculating system illustrated in FIG. 10.
Figure 12:
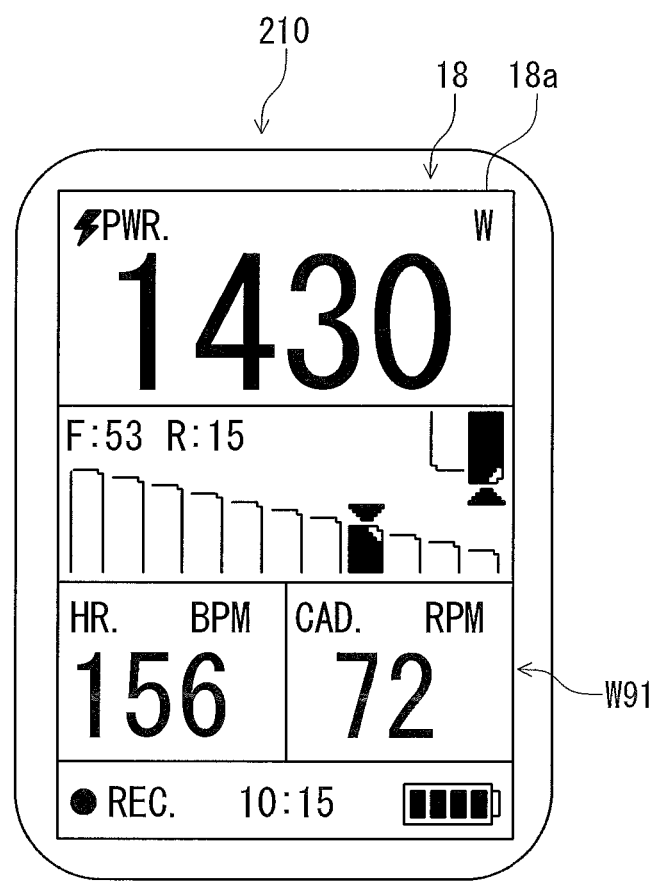
FIG. 12 is a schematic diagram showing one example of a display screen of a display device provided in the bicycle setting calculating system illustrated in FIG. 10.

As seen in FIG. 11, since the steps S1, S31, S32 and S33 are the same as that of the bicycle setting calculating system 10 in accordance with the first embodiment, they will not be described in detail here for the sake of brevity.

In step S201, the current front shift position SPf is detected by the front-shift-position detector 246. In step S202, the current rear shift position SPr is detected by the rear-shift-position detector 248.

In step S203, the current gear ratio Gc is calculated by the current-gear-ratio calculator 250 based on the current front shift position SPf, the current rear shift position SPr and the formula (8).

In step S204, the maximum sustainable cadence Cmax is calculated by the reference cadence calculator 252 based on current gear ratio Gc, the wheel rotational speed Cw and the formula (9).

In step S205, the maximum sustainable cadence Cmax is displayed on the display device 18. More specifically, as seen in FIG. 12, the maximum sustainable cadence Cmax is displayed in a cadence window W91 on the display device 18. The steps S201 to S205 are periodically repeated since the front-shift-position detector 246 and the rear-shift-position detector 248 periodically transmit the front shift position and the rear shift position to the current-gear-ratio calculator 250.

With the bicycle setting calculating system 210, the reference-cadence calculating device 220 is configured to calculate the maximum sustainable cadence Cmax for a rider based on the bicycle information Ib and the rider information Ir. The rider can consider whether the current gear ratio Gc (i.e., the current front shift position and/or the current rear shift position) is appropriate to the rider's physical lever and/or the environmental condition based on the maximum sustainable cadence Cmax.

For example, an appropriate cadence for a rider is generally from 80 rpm to 90 rpm. In the illustrated embodiment, the maximum sustainable cadence Cmax is 72 rpm lower than 80 rpm. The rider can recognize that the maximum sustainable cadence Cmax is lower than the appropriate cadence. Accordingly, the rider can understand that the appropriate gear ratio should be lower than the current gear ratio Gc, allowing the current shift position to be changed to the appropriate shift position.

In the present application, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle setting calculating system comprising:
 a drive-train calculating device configured to calculate reference drive-train information as a reference for a setting of a drive train based on bicycle information relating to a bicycle configured to be equipped with the drive train, and rider information relating to a rider who is to ride the bicycle, the rider information including sustainable power for the rider and target cadence for the rider, the reference drive-train information including a target gear ratio with which the target cadence is maintained during pedaling, and the drive-train calculating device including a target gear-ratio calculator configured to calculate the target gear ratio as the reference drive-train information based on the sustainable power, the target cadence, and the bicycle information.

2. The bicycle setting calculating system according to claim 1, wherein the bicycle information includes predetermined selectable gear ratios of the bicycle, the drive-train calculating device includes a gear-ratio selector configured to select at least one most recommended gear ratio equal to the target gear ratio from the predetermined selectable gear ratios of the drive train if the predetermined selectable gear ratios include at least one gear ratio equal to the target gear ratio, and the gear-ratio selector is configured to select at least one most recommended gear ratio closest to and less than the target gear ratio from the predetermined selectable gear ratios of the drive train if the predetermined selectable gear ratios are different from the target gear ratio.

3. The bicycle setting calculating system according to claim 1, wherein the bicycle information includes predetermined selectable gear ratios of the bicycle, and the drive-train calculating device includes a gear-ratio selector configured to select at least one recommended gear ratio equal to or less than the target gear ratio from the predetermined selectable gear ratios of the bicycle.

4. The bicycle setting calculating system according to claim 3, wherein the bicycle information includes component information relating to potential drive-train-component groups each including potential drive-train components each configured to be provided in the drive train, each of the potential drive-train components has gear ratios, and each of the predetermined selectable gear ratios comprises a minimum gear ratio among the gear ratios of each of the potential drive-train components.

5. The bicycle setting calculating system according to claim 4, further comprising:

a component selector via which a drive-train-component group is selected from the potential drive-train-component groups, wherein the gear-ratio selector is configured to select the at least one recommended gear ratio equal to or less than the target gear ratio from the predetermined selectable gear ratios of the drive-train-component group selected via the component selector.

6. The bicycle setting calculating system according to claim 3, wherein the bicycle information includes component information relating to front sprocket assemblies and rear sprocket assemblies configured to be provided in the drive train, and the gear-ratio selector is configured to select at least one recommended combination from combinations of the front sprocket assemblies and the rear sprocket assemblies based on the at least one recommended gear ratio.

7. The bicycle setting calculating system according to claim 6, further comprising:

a display controller configured to control a display device to display the at least one recommended combination selected by the gear-ratio selector.

8. The bicycle setting calculating system according to claim 3, further comprising:

a display controller configured to control a display device to display the at least one recommended gear ratio selected by the gear-ratio selector.

9. The bicycle setting calculating system according to claim 1, further comprising:

a display controller configured to control a display device to display the reference drive-train information calculated by the drive-train calculating device.

10. The bicycle setting calculating system according to claim 1, further comprising:

an information input device via which the rider information and the bicycle information are inputted.

11. The bicycle setting calculating system according to claim 1, wherein the drive-train calculating device is configured to calculate the reference drive-train information based on
the rider information,
the bicycle information, and
environmental information relating to environment under which the rider is to ride the bicycle.

12. The bicycle setting calculating system according to claim 11, wherein the environmental information includes road-grade information relating to road grade of a course on which the rider is to ride the bicycle, and the drive-train calculating device is configured to calculate the reference drive-train information based on the rider information, the bicycle information and the road-grade information.

13. The bicycle setting calculating system according to claim 12, wherein the road-grade information includes a maximum road grade of the course on which the rider is to ride the bicycle, and the drive-train calculating device is configured to calculate the reference drive-train information based on the rider information, the bicycle information and the maximum road grade.

14. A method of calculating a bicycle setting, comprising:

calculating reference drive-train information as a reference for a setting of a drive train based on
bicycle information relating to a bicycle configured to be equipped with the drive train, and
rider information relating to a rider who is to ride the bicycle, the rider information including sustainable power for the rider and target cadence for the rider, the reference drive-train information including a target gear ratio with which the target cadence is maintained during pedaling, and the calculating of the reference drive-train information including calculating the target gear ratio as the reference drive-train information based on the sustainable power, the target cadence, and the bicycle information.

15. A computer-readable storage medium storing a program for causing a computer to execute a process comprising:

calculating reference drive-train information as a reference for a setting of a drive train based on bicycle information relating to a bicycle configured to be equipped with the drive train, and rider information relating to a rider who is to ride the bicycle, the rider information including sustainable power for the rider and target cadence for the rider, the reference drive-train information including a target gear ratio with which the target cadence is maintained during pedaling, and the calculating of the reference drive-train information including calculating the target gear ratio as the reference drive-train information based on the sustainable power, the target cadence, and the bicycle information.

16. A bicycle setting calculating system comprising:

a reference-cadence calculating device configured to calculate maximum sustainable cadence for a rider based on bicycle information relating to a drive train of a bicycle, and rider information relating to the rider who is to ride the bicycle, the rider information including sustainable power for the rider, the bicycle information including a current gear ratio of the bicycle, and the reference-cadence calculating device including a reference cadence calculator configured to calculate the maximum sustainable cadence based on the sustainable power and the current gear ratio.

* * * * *